United States Patent
Yuki

(10) Patent No.: US 11,132,156 B2
(45) Date of Patent: Sep. 28, 2021

(54) IMAGE FORMING APPARATUS

(71) Applicant: KYOCERA Document Solutions Inc., Osaka (JP)

(72) Inventor: Akira Yuki, Osaka (JP)

(73) Assignee: Kyocera Document Solutions, Inc.

(*) Notice: Subject to any disclaimer, the term of this patent is extended or adjusted under 35 U.S.C. 154(b) by 0 days.

(21) Appl. No.: 16/997,838

(22) Filed: Aug. 19, 2020

(65) Prior Publication Data

US 2021/0064313 A1   Mar. 4, 2021

(30) Foreign Application Priority Data

Aug. 27, 2019  (JP) .............................. JP2019-155080

(51) Int. Cl.
*G06F 3/12* (2006.01)
*G03G 21/20* (2006.01)

(52) U.S. Cl.
CPC ......... *G06F 3/1243* (2013.01); *G03G 21/203* (2013.01); *G06F 3/1206* (2013.01)

(58) Field of Classification Search
None
See application file for complete search history.

(56) References Cited

U.S. PATENT DOCUMENTS

| | | | | |
|---|---|---|---|---|
| 8,208,162 B2 * | 6/2012 | Kawara | ................... | G06F 3/122 358/1.15 |
| 8,446,636 B2 * | 5/2013 | Yamazaki | ............. | G06F 3/1285 358/1.9 |
| 8,631,320 B2 * | 1/2014 | Miyamoto | ............ | G06F 40/174 715/243 |
| 2005/0283721 A1 * | 12/2005 | Warmus | ................ | G06F 40/197 715/251 |
| 2008/0212122 A1 * | 9/2008 | Kawafuji | ............... | G06F 3/1243 358/1.13 |
| 2011/0194142 A1 * | 8/2011 | Wakana | .................. | G06K 15/02 358/1.15 |
| 2014/0347412 A1 * | 11/2014 | Jintsugawa | ........... | G06F 3/1243 347/5 |

FOREIGN PATENT DOCUMENTS

JP     2004-078413     3/2004

* cited by examiner

*Primary Examiner* — Dung D Tran

(57) ABSTRACT

In an image forming apparatus, a print data acquiring unit acquires variable-data-printing print data that includes common document data and insert data. The common document data includes a common part common to plural printed matters. The insert data is for a variable part individually set for each of the plural printed matters. The common document data includes one or plural identifiers; the identifier indicates the variable part, and the insert data includes one or plural values corresponding to the identifier. The variable-data-printing processing unit causes a printing device to perform variable data printing on the basis of print data obtained by replacing the identifier in the common document data with the value. In addition, the variable-data-printing processing unit determines a print sheet corresponding to the value used in the replacement, and causes the printing device to perform the variable data printing using the determined print sheet.

6 Claims, 5 Drawing Sheets

FIG. 5

| RANK | HUMIDITY | SHEET TYPE | COLOR PROFILE |
|---|---|---|---|
| A | <30% | XXX1 | CPxxx1 |
| ⋮ | | | |
| A | 50%~60% | XXX2 | CPxxx2 |
| ⋮ | | | |

14c

IMAGE FORMING APPARATUS

CROSS-REFERENCE TO RELATED APPLICATIONS

This application relates to and claims priority rights from Japanese Patent Application No. 2019-155080, filed on Aug. 27, 2019, the entire disclosures of which are hereby incorporated by reference herein.

BACKGROUND

1. Field of the Present Disclosure

The present disclosure relates to an image forming apparatus.

2. Description of the Related Art

An image forming apparatus performs variable data printing. When creating plural printed matters, the variable data printing inserts different insert objects for the plural printed matters to a common document.

In a commercial printing market or the like, for each print sheet, a color profile suitable to the print sheet is prepared, and a color reproduction characteristic of an image to be printed is adjusted using the color profile corresponding to the print sheet and thereafter the image is printed on the print sheet.

In the aforementioned variable data printing, plural printed matters are created while content (character or the like) of an image to be printed is changed. However, the plural printed matters are hardly created with respective different print output characteristics (print sheets, color profiles and/or the like).

SUMMARY

An image forming apparatus according to an aspect of the present disclosure includes a print data acquiring unit and a variable-data-printing processing unit. The print data acquiring unit is configured to acquire variable-data-printing print data that includes common document data and insert data, the common document data including a common part common to plural printed matters, the insert data for a variable part individually set for each of the plural printed matters. The variable-data-printing processing unit is configured to cause a printing device to perform variable data printing on the basis of the variable-data-printing print data. The common document data includes one or plural identifiers; the identifier indicates the variable part; and the insert data includes one or plural values corresponding to the identifier. The variable-data-printing processing unit causes the printing device to perform the variable data printing on the basis of print data obtained by replacing the identifier in the common document data with the value. Further, when causing the printing device to perform the variable data printing, the variable-data-printing processing unit determines a print sheet corresponding to the value used in the replacement on the basis of print output characteristic data that indicates a print sheet corresponding to a value of the identifier, and causes the printing device to perform the variable data printing based on the print data corresponding to the value using the determined print sheet.

These and other objects, features and advantages of the present disclosure will become more apparent upon reading of the following detailed description along with the accompanied drawings.

BRIEF DESCRIPTION OF THE DRAWINGS

FIG. 5 shows a diagram that indicates an example of print output characteristic data 14c in Embodiment 2.

DETAILED DESCRIPTION

Hereinafter, embodiments according to an aspect of the present disclosure will be explained with reference to drawings.

Embodiment 1

Figure 1:
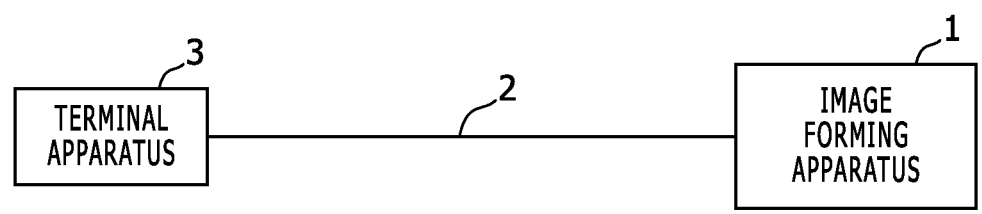
FIG. 1 shows a block diagram that indicates a configuration of an image forming system that includes an image forming apparatus according to an embodiment of the present disclosure.

FIG. 1 shows a block diagram that indicates a configuration of an image forming system that includes an image forming apparatus according to an embodiment of the present disclosure. In the system shown in FIG. 1, an image forming apparatus 1 is capable of communication with a terminal apparatus 3 through a communication path 2 such as Internet. The image forming apparatus 1 is an image forming apparatus according to an embodiment of the present disclosure, here, a multi-function peripheral, but may be another apparatus such as printer having a printing function. The communication path 2 is a wired or wireless local area network such as intra-LAN (local area network), or a wired or wireless communication path of a peripheral device interface. The terminal apparatus 3 is a personal computer or the like in which a driver program for the image forming apparatus 1 has been installed.

Figure 2:
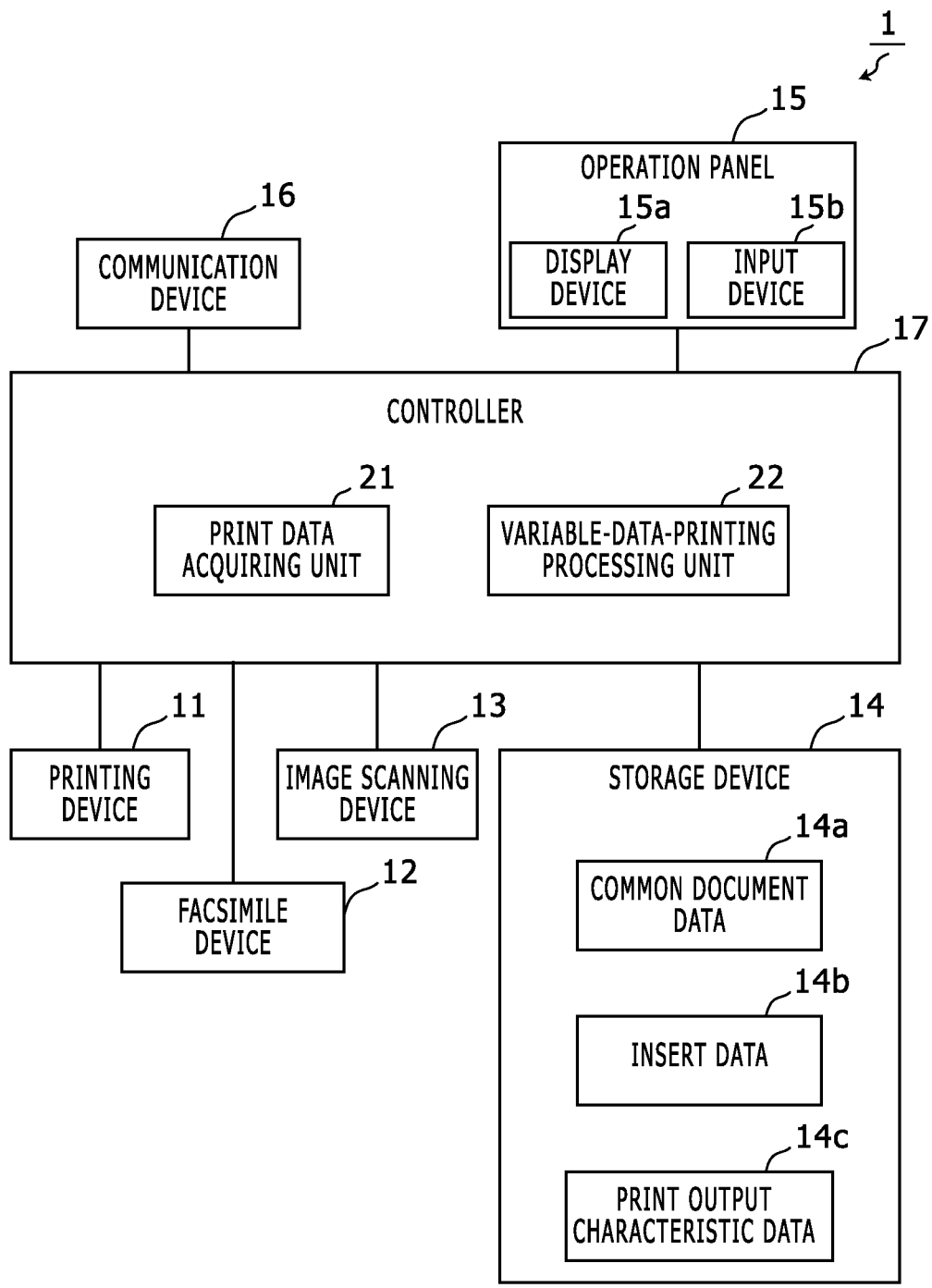
FIG. 2 shows a block diagram that indicates a configuration of an image forming apparatus 1 in FIG. 1.

FIG. 2 shows a block diagram that indicates a configuration of an image forming apparatus 1 in FIG. 1. As shown in FIG. 2, the image forming apparatus 1 includes a printing device 11, a facsimile device 12, an image scanning device 13, a storage device 14, an operation panel 15, a communication device 16, and a controller 17.

The printing device 11 is an internal device that prints an image on a print sheet (e.g. print paper sheet) page by page on the basis of image data in an ink-jet manner, an electrophotographic manner or the like.

The facsimile device 12 is an internal device that transmits and receives an image as a facsimile signal through a public telephone line or the like using a modem.

The image scanning device 13 is an internal device that scans a document image of a document and generates image data of the document image.

The storage device 14 is a nonvolatile storage device such as flash memory. For example, if necessary, in the storage device 14, common document data 14a and insert data 14b are stored for variable data printing. The common document data 14a and the insert data 14b may be acquired from the terminal apparatus 3.

The operation panel 15 is arranged on a housing surface of the image forming apparatus 1, and includes a display device 15a that displays some information to a user and an input device 15b that receives a user operation. For example, a liquid crystal display is used as the display device 15a. A key switch, a touch panel or the like is used as the input device 15b.

The communication device 16 is a circuit that performs data communication with another device (the terminal apparatus 3 or the like) through the communication path 2. For example, a network interface is used as the communication device 16.

Further, the processor 17 includes a computer or an ASIC (Application Specific Integrated Circuit) that includes a CPU (Central Processing Unit), a ROM (Read Only Memory), and a RAM (Random Access Memory), loads a program from the ROM, the storage device 14, or the like to the RAM, and executes the program with the CPU and thereby acts as various processing units.

In this embodiment, the controller 17 acts as a print data acquiring unit 21 and a variable-data-printing processing unit 22.

The print data acquiring unit 21 acquires variable-data-printing print data that includes common document data 14a and insert data 14b. The common document data 14a includes a common part common to plural printed matters, and the insert data 14b is for a variable part individually set for each of the plural printed matters. The acquired common document data 14a and the acquired insert data 14b are stored in the RAM or the storage device 14. For example, the variable-data-printing print data is acquired from the terminal apparatus 3.

The common document data 14a indicates (a) a common object arranged in the common part and (b) a position and an identifier of the variable part, and the insert data 14b indicates plural insert objects respectively arranged in the variable part of plural printer matters. The common document data 14a is described in PDL (Page Description Language) or the like, for example.

For example, the common object is a fixed text, a fixed logo mark, a fixed photograph, a fixed image (e.g. an image of a signature or the like), or the like. For example, the insert object is a text that indicates personal information such as name and/or address, a text and/or an image for advertisement, or the like. The insert data 14b is a list such as address book, and specifies insert objects (i.e. values to be inserted to the variable part) of the same number as the number of the printed matters.

Figure 3:
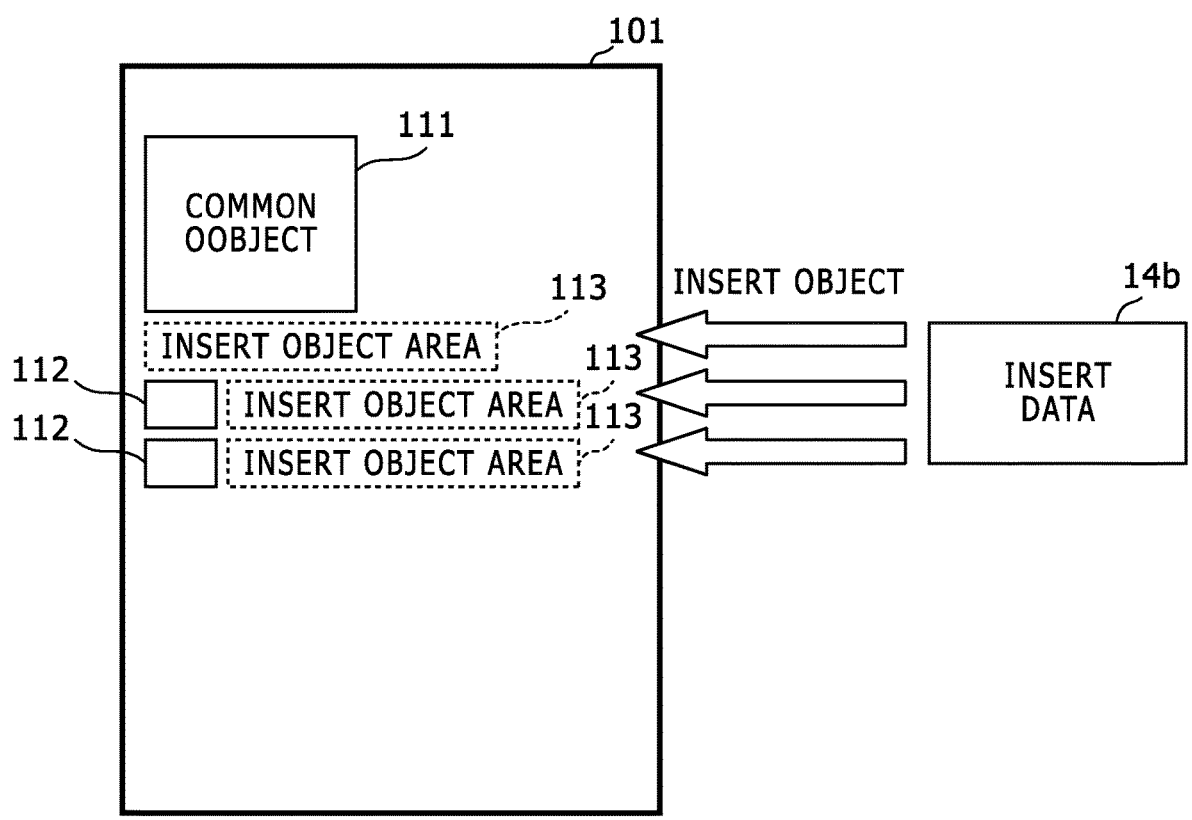
FIG. 3 shows a diagram that indicates an example of a layout of a printed matter in variable data printing.

FIG. 3 shows a diagram that indicates an example of a layout of a printed matter in variable data printing. In a layout of a document page 101 shown in FIG. 3, common objects 111 and 112 (i.e. common parts) and insert object areas 113 (i.e. variable parts) are arranged.

The variable-data-printing processing unit 22 causes the printing device 11 to perform variable data printing on the basis of variable-data-printing print data (i.e. the common document data 14a, the insert data 14b, and print output characteristic data 14c mentioned below).

Specifically, the common document data includes one or plural identifiers such that each of the identifier(s) indicates a variable part, and the insert data includes values corresponding to each of the one or plural identifiers, and the variable-data-printing processing unit 22 replaces the identifier in the common document data 14a with the corresponding value in the insert data 14b and thereby generates print data, and causes the printing device 11 to perform variable data printing on the basis of the generated print data.

Further, when causing the printing device 11 to perform variable data printing on the basis of the print data obtained by replacing the aforementioned identifier with the aforementioned value, the variable-data-printing processing unit 22 determines a print sheet corresponding to the value used in the replacement on the basis of the print output characteristic data 14c, and causes the printing device 11 to perform the variable data printing using the determined print sheet.

Specifically, a print sheet is selected of a type (e.g. a size such as A4 or B5, a sheet type such as plain paper sheet or thick paper sheet, and/or the like) corresponding to the value used in the replacement, and the printing device 11 feeds and transports the selected type of print sheet, and prints on this print sheet an image based on the aforementioned print data.

Here, the print output characteristic data 14c is stored with the insert data 14b in the storage device 14, and indicates a print sheet corresponding to the aforementioned values for the aforementioned identifier.

In this embodiment, the print output characteristic data 14c indicates a print sheet and a color profile corresponding to the aforementioned values for the aforementioned identifier, and the variable-data-printing processing unit 22 determines a print sheet and a color profile corresponding to the value used in the replacement on the basis of the print output characteristic data 14c, and causes the printing device 11 to perform the variable data printing using the determined print sheet and the determined color profile.

Therefore, for plural printed matters created in the variable data printing, respective different print output characteristics (sheet types, color profiles and/or the like) can be applied.

Figure 4:
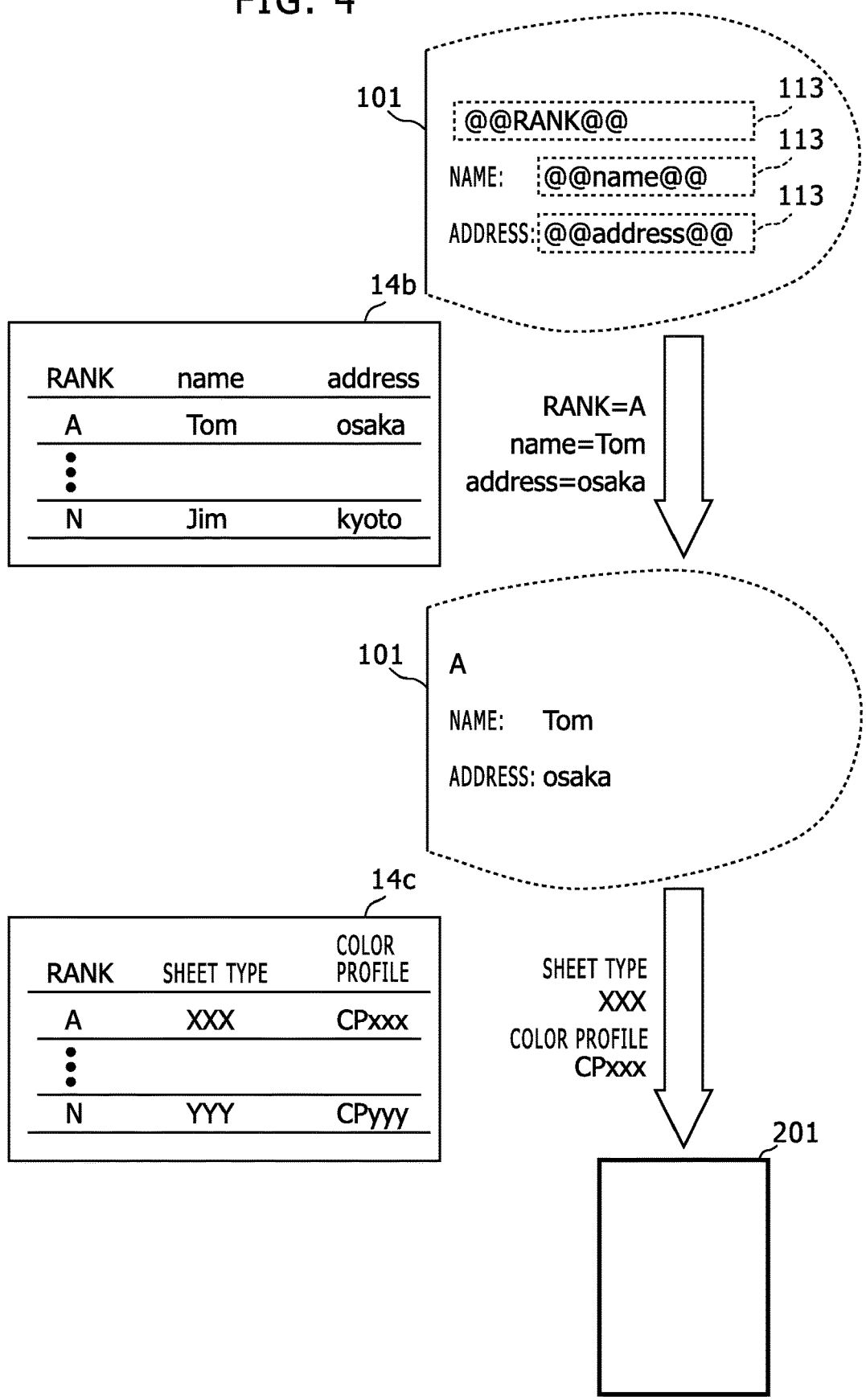
FIG. 4 shows a diagram that explains variable data printing performed by the image forming apparatus 1 shown in FIG. 2.

FIG. 4 shows a diagram that explains variable data printing performed by the image forming apparatus 1 shown in FIG. 2.

For example, as shown in FIG. 4, if in the insert object areas 113 of the document page 101 based on the common document data 14a, the identifiers "RANK", "name", and "address" are described; in the insert data 14b, plural sets of values for the identifiers "RANK", "name", and "address" are specified as (A, Tom, osaka), . . . , (N, Jim, kyoto); and in the print output specific data 14c, sheet types and color profiles are specified corresponding to respective plural values "A", . . . , "N" for the identifier "RANK", then when the set of the values "A", "Tom", and "osaka" is applied to the identifiers "RANK", "name", and "address", the document page 101 obtained by replacing the identifiers "RANK", "name", and "address" with the values "A", "Tom", and "osaka" is printed with the sheet type "XXX" and the color profile "CPxxx" corresponding to the value "A" of the identifier "RANK", and thereby a printed matter 201 is created.

It should be noted that in FIG. 4, the aforementioned identifier is a string that is described in a unique format so as to be distinguished from another string. Here, the aforementioned identifier is expressed so as to be enclosed in two sets of two sequential "@"s.

The following part explains a behavior of the image forming apparatus 1 of Embodiment 1.

The print data acquiring unit 21 acquires common document data 14a, insert data 14b, and print output specific data 14c specified by a user, for example, from the terminal apparatus 3, and stores the data 14a, 14b, and 14c into the storage device 14.

Afterward, the variable-data-printing processing unit performs variable data printing based on the common document data 14a, the insert data 14b, and the print output specific data 14c in accordance with a user operation to the terminal apparatus 3 or the operation panel 15.

In this process, the variable-data-printing processing unit 22 (a) sequentially reads plural sets of values in the insert data 14b, (b) replaces description parts of corresponding identifiers in the common document data 14a with the values in each set of the plural sets and thereby generates print data for each printed matter, and determines a sheet type and a color profile corresponding to the value of a specific identifier (e.g. "RANK" in the aforementioned example), (c) performs image processing (color conversion, color correction and/or the like) based on the determined color profile for the generated print data, and thereafter (d) causes the printing device 11 to perform printing an image on a print sheet of the determined sheet type on the basis of the print data and thereby creates a printed matter corresponding to the set of the values.

Consequently, a document in which one or plural values in each set in the insert data 14b is/are applied to one or plural identifiers in the common document data 14a is printed with a print sheet and a color profile corresponding to a value of a specific identifier in the set.

As mentioned, in Embodiment 1, the print data acquiring unit 21 acquires variable-data-printing print data that includes common document data and insert data. The common document data includes a common part common to plural printed matters, and the insert data is for a variable part individually set for each of the plural printed matters. The variable-data-printing processing unit 22 causes the printing device 11 to perform variable data printing on the basis of the variable-data-printing print data. Here, the common document data includes one or plural identifiers. This identifier indicates the variable part. The insert data includes one or plural values corresponding to the identifier. The variable-data-printing processing unit 22 causes the printing device 11 to perform the variable data printing on the basis of print data obtained by replacing the identifier in the common document data with the aforementioned value. Further, when causing the printing device 11 to perform the variable data printing on the basis of the print data obtained by replacing the identifier in the common document data with the aforementioned value, the variable-data-printing processing unit 22 determines a print sheet corresponding to the value used in the replacement on the basis of print output characteristic data that indicates a print sheet corresponding to a value of the identifier, and causes the printing device 11 to perform the variable data printing based on the print data corresponding to the value using the determined print sheet.

Consequently, in variable data printing, plural printed matters can be created with respective different print output characteristics.

Embodiment 2

FIG. 5 shows a diagram that indicates an example of print output characteristic data 14c in Embodiment 2. In Embodiment 2, the image forming apparatus 1 further includes a humidity sensor (not shown), and the print output characteristic data 14c indicates a print sheet and a color profile corresponding to a value of the aforementioned identifier and a humidity measurement value of the humidity sensor. Further, in Embodiment 2, the variable-data-printing processing unit 22 determines a print sheet and a color profile corresponding to the value used in the replacement and a current humidity measurement value of the humidity sensor on the basis of the print output characteristic data 14c, and causes the printing device 11 to perform the variable data printing using the determined print sheet and the determined color profile.

In the print output characteristic data 14c, for example, as shown in FIG. 5, a humidity measurement value of the humidity sensor may be specified as a range of the value.

In such a case, if the values for the aforementioned specific identifier are the same but the humidity measurement values are different, then the printing can be performed with different sheet types and different color profiles.

Other parts of the configuration and behaviors of the image forming apparatus in Embodiment 2 are identical or similar to those in Embodiment 1, and therefore not explained here.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

For example, in the aforementioned embodiments, if the common document data 14a includes plural identifiers and the insert data 14b includes values corresponding to the plural identifiers, then the print output characteristic data 14c may indicate a print sheet (and a color profile) corresponding to a combination of the values of the plural identifiers. In such a case, the variable-data-printing processing unit 22 determines a print sheet (and a color profile) corresponding to a combination of the values in the replacement of the aforementioned plural identifiers on the basis of such print output characteristic data 14c, and causes the printing device 11 to perform the variable data printing using the determined print sheet (and the determined color profile).

Further, in the aforementioned embodiments, regarding an identifier of which a value is not necessary to be printed (e.g. the aforementioned "@@RANK@@"), in the common document data 14a (the document page 101), (a) an offset value of an arrangement position of the identifier may be set, and if the offset value is set, then the value of such identifier may not be printed by arranging the value of such identifier outside of a printable area in accordance with the offset value, or (b) a flag that indicates non-print may be set in the description of the identifier, and if the flag is set, then the value of such identifier may not be printed by removing a description part of the identifier without adding the value in the document page 101 although the identifier is evaluated (i.e. although the corresponding value is determined).

What is claimed is:

1. An image forming apparatus, comprising:
a print data acquiring unit configured to acquire variable-data-printing print data that includes common document data and insert data, the common document data including a common part common to plural printed matters, the insert data for a variable part individually set for each of the plural printed matters;
a variable-data-printing processing unit configured to cause a printing device to perform variable data printing on the basis of the variable-data-printing print data;
wherein the common document data includes one or plural identifiers;
the identifier indicates the variable part;

the insert data includes one or plural values corresponding to the identifier;

the variable-data-printing processing unit causes the printing device to perform the variable data printing on the basis of print data obtained by replacing the identifier in the common document data with the value; and the variable-data-printing processing unit further determines a print sheet corresponding to the value used in the replacement on the basis of print output characteristic data that indicates a print sheet corresponding to a value of the identifier, and causes the printing device to perform the variable data printing based on the print data corresponding to the value using the determined print sheet.

2. The image forming apparatus according to claim 1, wherein the print output characteristic data indicates a print sheet and a color profile corresponding to a value of the identifier; and the variable-data-printing processing unit determines a print sheet and a color profile corresponding to the value used in the replacement on the basis of the print output characteristic data, and causes the printing device to perform the variable data printing based on the print data corresponding to the value using the determined print sheet and the determined color profile.

3. The image forming apparatus according to claim 2, further comprising a humidity sensor;

wherein the print output characteristic data indicates a print sheet and a color profile corresponding to a value of the identifier and a humidity measurement value of the humidity sensor; and the variable-data-printing processing unit determines a print sheet and a color profile corresponding to the value used in the replacement and a current humidity measurement value of the humidity sensor on the basis of the print output characteristic data, and causes the printing device to perform the variable data printing based on the print data corresponding to the value using the determined print sheet and the determined color profile.

4. The image forming apparatus according to claim 1, further comprising a humidity sensor;

wherein the print output characteristic data indicates a print sheet corresponding to a value of the identifier and a humidity measurement value of the humidity sensor; and the variable-data-printing processing unit determines a print sheet corresponding to the value used in the replacement and a current humidity measurement value of the humidity sensor on the basis of the print output characteristic data, and causes the printing device to perform the variable data printing based on the print data corresponding to the value using the determined print sheet.

5. The image forming apparatus according to claim 4, wherein the print output characteristic data indicates a print sheet corresponding to a value of the identifier and a range of a humidity measurement value of the humidity sensor.

6. The image forming apparatus according to claim 1, wherein the common document data includes plural identifiers that indicate variable parts;

the insert data includes plural values corresponding to the identifiers;

the print output characteristic data indicates a print sheet corresponding to a combination of the values of the identifiers; and the variable-data-printing processing unit determines a print sheet corresponding to a combination of the values used in the replacement on the basis of the print output characteristic data, and causes the printing device to perform the variable data printing based on the print data corresponding to the value using the determined print sheet.

* * * * *